United States Patent [19]
Howell

[11] Patent Number: 6,042,148
[45] Date of Patent: Mar. 28, 2000

[54] LATERALLY SLIDABLE FOOTREST FOR A RIDE-ON VEHICLE FOR CHILDREN

[75] Inventor: William R. Howell, Chaffee, N.Y.

[73] Assignee: Mattel, Inc., El Segundo, Calif.

[21] Appl. No.: 09/015,613

[22] Filed: Jan. 28, 1998

[51] Int. Cl.[7] .................................................. A63G 13/00
[52] U.S. Cl. .......................................... 280/827; 280/291
[58] Field of Search .................................... 280/291, 827, 280/828, 160, 163, 164.1, 164.2, 165

[56] References Cited

U.S. PATENT DOCUMENTS

| | | | |
|---|---|---|---|
| 3,605,929 | 9/1971 | Rolland ................................... | 280/827 |
| 3,671,058 | 6/1972 | Kent . | |
| 4,108,458 | 8/1978 | Owens . | |
| 4,938,603 | 7/1990 | Turner et al. ............................. | 297/16 |
| 5,195,609 | 3/1993 | Ham et al. . | |
| 5,409,263 | 4/1995 | Klawitter ................................ | 280/827 |
| 5,503,411 | 4/1996 | Sundberg et al. .................... | 280/1.188 |
| 5,524,918 | 6/1996 | Peabody et al. . | |
| 5,697,626 | 12/1997 | McDaniel et al. . | |

*Primary Examiner*—Kevin Hurley
*Assistant Examiner*—Andrew J. Fischer
*Attorney, Agent, or Firm*—Kolisch, Hartwell, Dickinson, McCormack & Heuser

[57] ABSTRACT

A ride-on vehicle for children having a chassis, a plurality of wheels attached to the chassis, and a steering mechanism, the vehicle including a molded plastic footrest having a body portion and an end portion, the footrest being laterally slidable between a retracted position wherein the body portion is situated substantially within the chassis, and an extended position wherein at least part of the body portion is laterally disposed with respect to the chassis. In the extended position the end portion is a greater lateral distance from the chassis than when the end portion is in the retracted position. The vehicle also has a detent mechanism arranged to releasably hold the footrest in the retracted position and the extended position. The chassis can include a channel in which the footrest is laterally slidable.

8 Claims, 3 Drawing Sheets

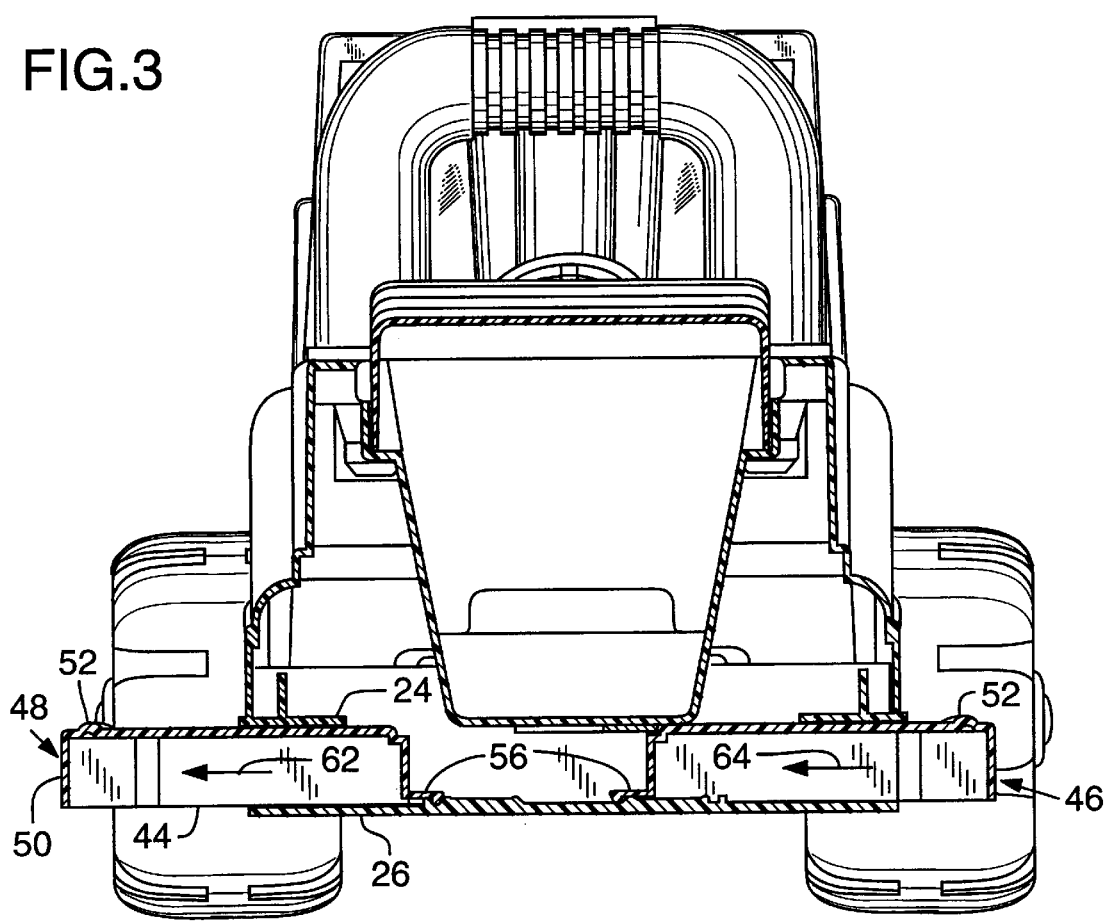
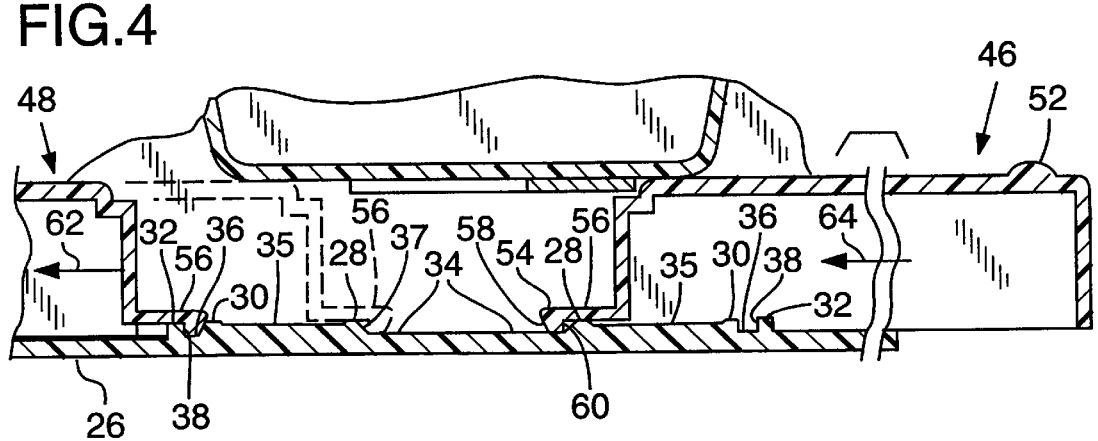

6,042,148

LATERALLY SLIDABLE FOOTREST FOR A RIDE-ON VEHICLE FOR CHILDREN

CROSS-REFERENCE TO RELATED APPLICATIONS

This application is related to co-pending U.S. application Ser. No. 09/014,834 entitled "Children's Ride-On Vehicle with Four-Wheel Steering," invented by William R. Howell and Kurt J. Huntsberger and filed Jan. 28, 1998, the disclosure of which is incorporated by reference in its entirety.

FIELD OF THE INVENTION

This invention relates to footrests, and more particularly to footrests for ride-on vehicles for children.

BACKGROUND OF THE INVENTION

Ride-on vehicles for children have become increasingly popular due in part to the desire of many children to drive self-propelled vehicles resembling full-size vehicles. Such ride-on vehicles are typically self-propelled under battery power and generally include scaled-down features of full-sized vehicles. Many different styles of such reduced-scale vehicles have been produced.

One challenge in designing a product line of reduced-scale vehicles is to ensure that the product line appeals to children of different sizes and age groups. However, a vehicle appropriate for a six-year-old child may not be appropriate for a three-year-old child. To this end, different sizes and designs of ride-on vehicles have been produced to appeal to different age groups of children, each vehicle specially designed to appeal to a certain age group. In the case of a vehicle usable by a small child, the vehicle design should reflect the inherent capabilities of small children. For instance, the small child may not be large enough to climb onto the vehicle unassisted. Although a parent or responsible adult may lift the child onto the vehicle, the vehicle should be designed so that the child can easily get on and off the vehicle unassisted if necessary. In addition, the child may not want to sacrifice his or her independence by constantly requiring adult assistance in using the vehicle.

It is therefore an object of the present invention to provide a ride-on vehicle for children having a mechanism for assisting a child in mounting and dismounting the vehicle.

It is another object of the present invention to provide a mechanism for assisting a child in mounting and dismounting a reduced-scale vehicle, the mechanism being appropriate for use by small children.

SUMMARY OF THE INVENTION

The present invention overcomes these obstacles by providing a ride-on vehicle for children having a chassis, a plurality of wheels attached to the chassis, and a steering mechanism, the vehicle including a molded plastic footrest having a body portion and an end portion, the footrest being laterally slidable between a retracted position wherein the body portion is situated substantially within the chassis, and an extended position wherein at least part of the body portion is laterally disposed with respect to the chassis. In the extended position the end portion is a greater lateral distance from the chassis than when the end portion is in the retracted position. The vehicle also has a detent mechanism arranged to releasably hold the footrest in the retracted position and the extended position. The chassis can include a channel in which the footrest is laterally slidable.

These and other objects, advantages and novel features of the invention will be set forth in part in the description which follows.

BRIEF DESCRIPTION OF THE DRAWINGS

FIG. 3 is a cross-section view of the vehicle taken along line 3—3 in FIG. 2.

FIG. 4 is an enlargement of FIG. 3.

DETAILED DESCRIPTION OF THE PREFERRED EMBODIMENTS

Figure 1:
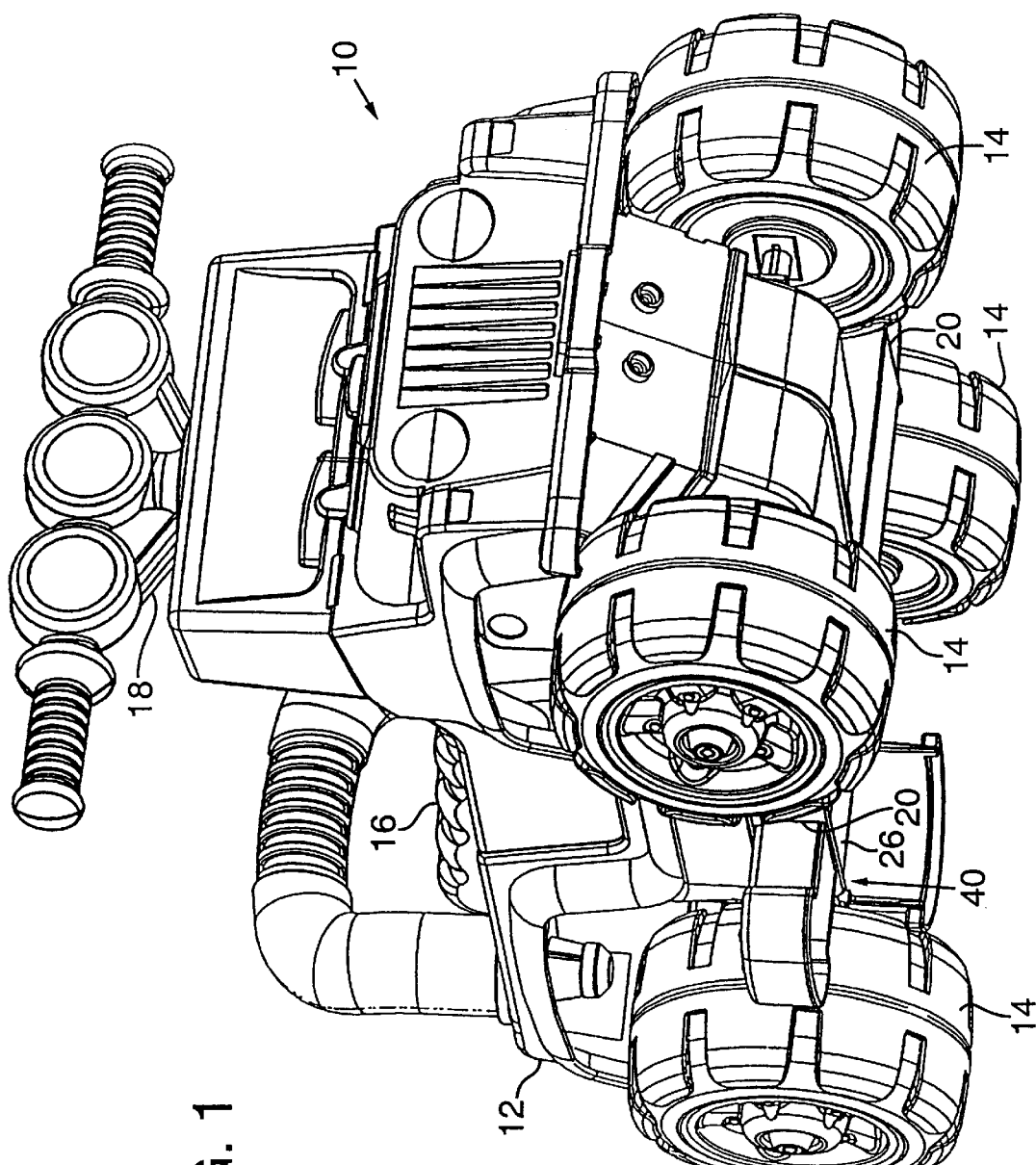
FIG. 1 is a perspective view of a child's ride-on vehicle according to a preferred embodiment of the present invention.

A ride-on vehicle for children according to the present invention is shown in FIG. 1 and is indicated generally at 10. Vehicle 10 includes a chassis 12, wheels 14 rotatably attached to the chassis, and a seat 16 disposed on the chassis. Steering mechanism 18 turns wheels 14 with respect to chassis 12.

Channels 20 are attached to the underside of each side of chassis 12 and form part of the chassis. As the channels are substantially identical, only one channel will be described, but it will be understood that any feature disclosed on one channel is also found on the other channel. Channel 20 includes an upper wall 24 and a lower wall 26. As shown in FIGS. 3 and 4, lower wall 26 has first, second and third ridges 28, 30, 32 alternating with first, second and third depressions 34, 35, 36. First ridge 28 has a sloped side 37 which faces first depression 34. Second depression 35 is somewhat more shallow than first and third depressions 34, 36. Third depression 36 has a vertical side 38.

Footrests 40 are disposed in each channel 20. As the footrests are substantially identical, only one footrest will be described, it being understood that any feature disclosed on one footrest is also found on the other footrest. Footrest 40 is made of integrally molded plastic and has a generally hollow construction. The footrest has a body portion 44 shaped to conform to channel 20 and is laterally slidable with respect to the channel between a retracted position, shown generally at 46, and an extended position shown generally at 48. A flared end portion 50 defines the outer boundary of body portion 44. Flared end portion 50 has a tread-enhancing structure which includes a plurality of raised areas 52 formed integrally with the footrest. The raised areas provide a more sure footing for a driver when mounting and dismounting the vehicle.

Figure 2:
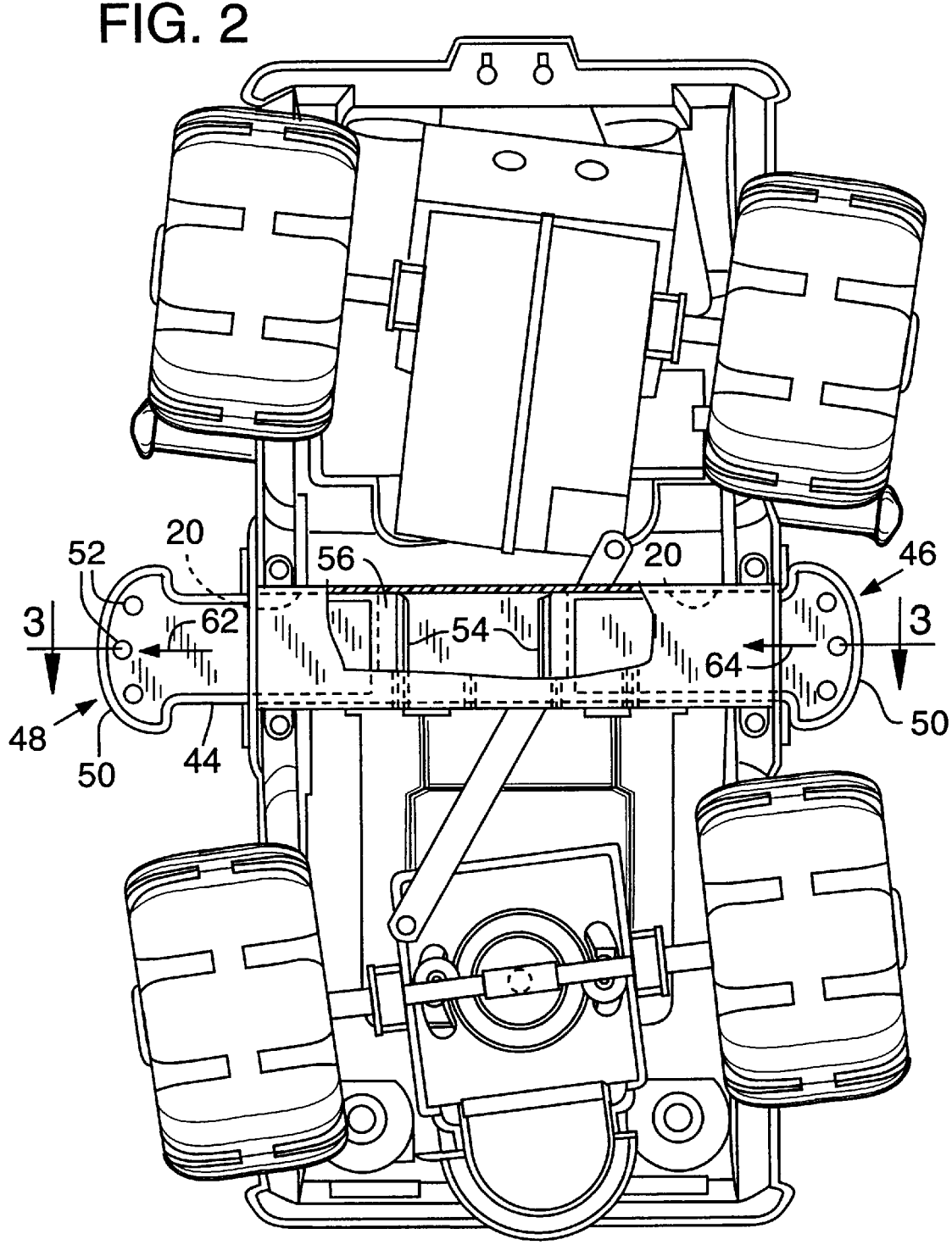
FIG. 2 is a view of the underside of the vehicle in FIG. 1.

Attached to body portion 44 at a side opposite flared end portion 50 is a hook member 54 extending vertically downwardly from a horizontal extension 56 of body portion 44. As footrest 40 is made of plastic, horizontal extension 56 has some degree of natural resilience which enables hook member 54 to move vertically. Hook member 54 is positioned to run along the ridges and depressions of lower wall 26 as footrest 40 laterally slides in and out of channel 20. The hook member can be of the width as shown in FIG. 2, or could be of any other suitable width. As best shown in FIG. 4, hook member 54 has an angled edge 58 and a vertical edge 60. The ridges and depressions on lower wall 26 combine with the hook member to form a detent mechanism which operates as follows. When footrest 40 is in retracted position 46, hook member 54 sits in first depression 34. Sloped side 37 of first ridge 28 prevents outward movement of the footrest. When the footrest is pulled laterally outward in the direction shown by arrow 62, the hook member moves over the first ridge and into second depression 35. The footrest is set in extended position 48 when the hook member moves over second ridge 30 and into third depression 36. Vertical side 60 of hook member 54 contacts vertical side 38 of third ridge 32 and prevents further outward lateral movement of the footrest. To place the footrest in retracted position 46, the footrest is pushed in the direction shown by arrow 64 until the hook member moves over second ridge 30, along second depression 35, and over first ridge 28. Not only do first and second ridges 28, 30 hold the footrest in the retracted and extended positions, respectively, but the first and second ridges also provide a degree of safety by alerting the user when the footrest has fully achieved one of the two positions. As the hook member goes over the first or second ridges, the resilience of the hook member horizontal extension 56 causes the footrest to "snap" into position.

The footrest disclosed in the present embodiment is fully weight-supporting in both the retracted and the extended positions, and in any intermediate position therebetween. This adjustability of footrest is advantageous because it can be used with various foot sizes.

While the ride-on vehicle described in the present embodiment shows the use of two footrests, each laterally arranged on a vehicle, it is within the scope of the present invention to use any number of footrests disposed at any convenient position on the vehicle.

The foregoing description of the preferred embodiments of the invention has been presented for purposes of illustration and description. It is not intended to be exhaustive or to limit the invention to the precise form disclosed, and many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A child's ride-on vehicle having a chassis, a plurality of wheels rotatably mounted on the chassis, and a steering mechanism operatively coupled to the wheels, the vehicle comprising:

a channel formed within the chassis and including a plurality of spaced-apart ridges and depressions;

a molded plastic footrest extending from the chassis, the footrest having a body portion that telescopes at least partially within the channel and an end portion, the footrest being laterally slidable between a retracted position wherein the body portion is situated substantially within the chassis, and an extended position wherein at least part of the body portion is laterally disposed with respect to the chassis, wherein in the extended position the end portion is a greater lateral distance from the chassis than when the end portion is in the retracted position; and a detent mechanism adapted to releasably retain the footrest in the retracted position and the extended position, wherein the detent mechanism releasably retains the footrest in the extended and the retracted positions by sequentially engaging the ridges and depressions as the body portion of the footrest is laterally slid within the channel.

2. The ride-on vehicle of claim 1, wherein the detent mechanism includes a hook member extending from the body portion of the footrest, and adapted to sequentially engage the plurality of ridges and depressions to position and selectively retain the footrest in the retracted and the extended positions.

3. The ride-on vehicle of claim 1, wherein the footrest includes a tread-enhancing structure formed integrally with the footrest.

4. The child's ride-on vehicle of claim 2, wherein the hook member is resiliently deformable to selectively retain the footrest in the retracted and the extended positions but to release the footrest to slide between the extended and retracted positions when sufficient lateral force is applied to the footrest by a user.

5. A child's ride-on vehicle, comprising:

a chassis having spaced-apart side walls and a seat extending therebetween and upon which a child may be seated so that the child's legs straddle the side walls;

a plurality of wheels rotatably coupled to the chassis and including at least one forward wheel and at least one rearward wheel;

a pair of footrests, each extending from a respective one of the side walls of the chassis generally between the forward and rearward wheels, wherein each footrest is selectively positionable between a retracted position, adjacent the corresponding side wall, an extended position, in which the footrest is slid outwardly from the retracted position and adapted to support the seated child's foot, and further wherein each footrest includes a body portion that telescopes within a corresponding channel formed in the chassis; and a detent mechanism adapted to selectively position and retain the footrests in the extended position and the retracted position, wherein the detent mechanism includes a plurality of ridges and depressions extending along the lengths of the channels.

6. The child's ride-on vehicle of claim 5, wherein the detent mechanism further includes a plurality of hook structures, each adapted to sequentially engage the pluralities of ridges and depressions in a corresponding one of the channels to define the extended and retracted positions.

7. The child's ride-on vehicle of claim 5, wherein the detent mechanism is further adapted to selectively position and retain the footrests in an intermediate position generally between the retracted and the extended positions.

8. The child's ride-on vehicle of claim 7, wherein the detent mechanism further includes a plurality of hook structures, each adapted to sequentially engage the pluralities of ridges and depressions in a corresponding one of the channels to define the intermediate, extended and retracted positions.

* * * * *